March 5, 1963   G. P. KOCH   3,080,026
CLUTCH AND BRAKE CONTROL
Filed July 11, 1961
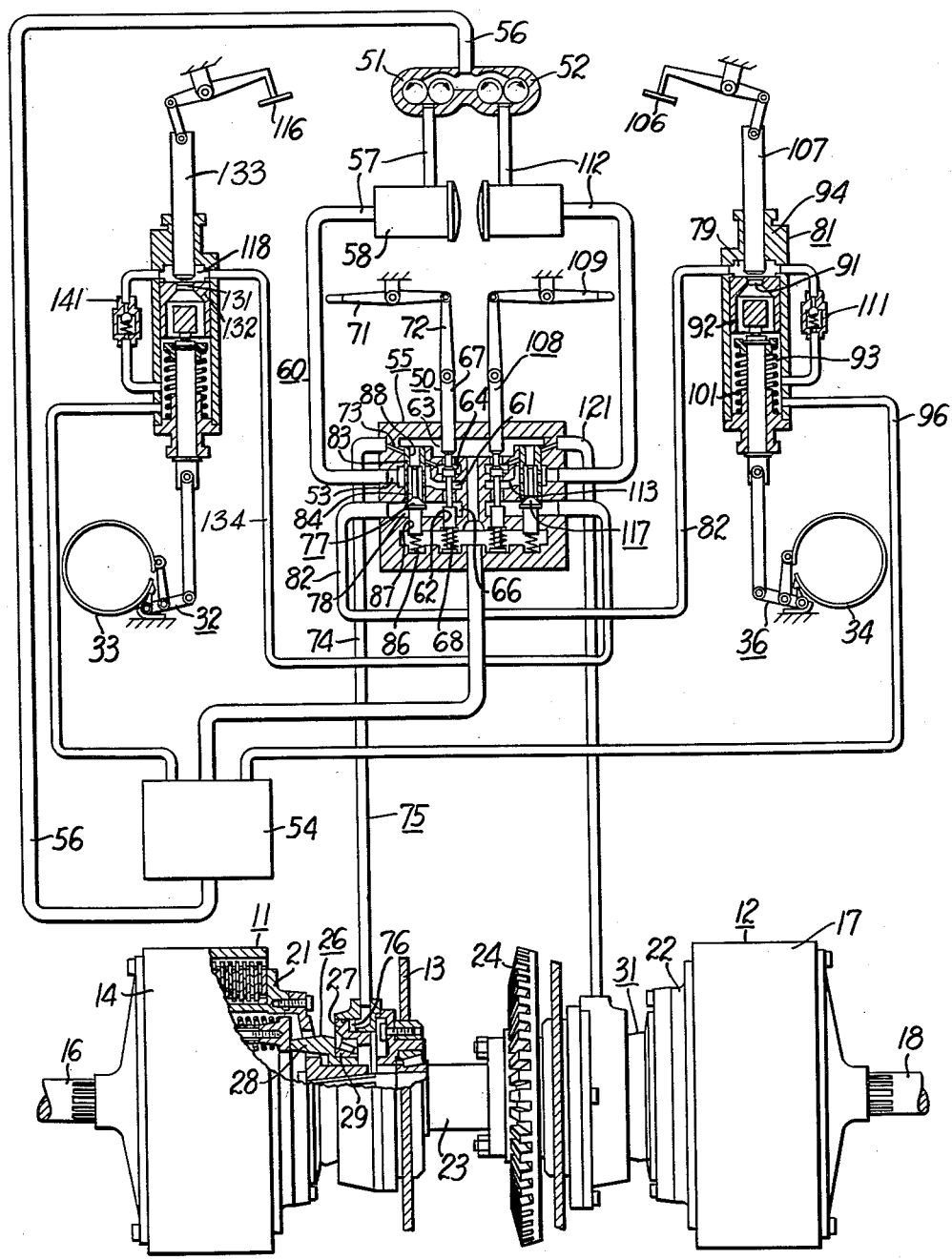
Inventor
George P. Koch
By Charles L. Schwab
Attorney United States Patent Office 3,080,026
Patented Mar. 5, 1963

3,080,026
CLUTCH AND BRAKE CONTROL
George P. Koch, Springfield, Ill., assignor to Allis-Chalmers Manufacturing Company, Milwaukee, Wis.
Filed July 11, 1961, Ser. No. 123,230
5 Claims. (Cl. 192—13)

This invention relates to a clutch and brake control and particularly to a steering by driving control for vehicles.

It is an object of this invention to provide a fast response steering by driving control for vehicles.

It is a further object of this invention to provide a hydraulic control system for steering clutches and running gear brakes of a vehicle wherein a cross flow between the clutch brake controls provents time lag in steering of the vehicle.

It is a further object of this invention to provide a steering by driving control of the type hereinbefore described which also affords cross steering of the vehicle.

It is a further object of this invention to provide a hydraulic system for controlling hydraulic clutches and brakes of endless track vehicles wherein control fluid passes from the control valve for the steering clutch at one side of the vehicle to the brake control valve for the brake at the opposite side of the vehicle and wherein the relief valve permitting flow of fluid from the clutch controlling circuit to the brake circuit is of the balanced type, thereby permitting the maximum pressure for the system to be held to a minimum.

It is a further object of this invention to provide a clutch and brake control of the type hereinbefore described wherein the biasing means for the brake valve also serves to hold the friction brake in a released condition.

These and other objects of this invention will be apparent to those familiar with the art when the following description is read in conjunction with the drawing which shows the subject invention schematically, with components thereof shown in section.

Referring to the drawing, the invention illustrated has particular application in an endless track vehicle such as that shown in the patent to William H. Bruce et al., U.S. 2,444,279, issued June 29, 1948, on a steering by driving control mechanism. A pair of hydraulically disengaged clutches 11, 12 are installed in the rear transmission housing 13 in a conventional manner. Such clutches are similar to the spring loaded clutches shown in W. F. Wilson, Patent 2,632,543, Clutch Installation for Motor Vehicles, issued March 24, 1953, and F. A. Schick, Patent 2,954,858, Multiple Disk Clutch, issued October 4, 1960. The clutch drum 14 of the steering clutch 11 is nonrotatably secured to an output shaft 16 which drives the left hand running gear or track, not shown. The clutch drum 17 is nonrotatably secured to output shaft 18 which drives the right hand running gear or endless track, not shown. The input hubs 21, 22 of the steering clutches 11, 12, respectively, are nonrotatably secured to a shaft 23 to which bevel gear 24 is nonrotatably secured. Bevel gear 24 is driven in a conventional manner through a vehicle power train, not shown. As illustrated in the cut out portion of steering clutch 11, the clutch throwout mechanism 26 is actuated by a hydraulic piston 27 acting against throwout collar 28 through a taper bearing 29. A description of the clutch throwout mechanism 26 of steering clutch 11 is equally applicable to the clutch throwout mechanism 31 of the steering clutch 12.

A band type friction brake mechanism 32 is provided for the left hand running gear. The brake band 33, though illustrated separately to facilitate the showing of the control system is actually in surrounding braking relationship to the radially outer surface of drum 14. Likewise, the brake band 34 of the right hand brake mechanism 36 is in surrounding, confronting relationship to the outer cylindrical surface of clutch drum 17 of the right hand steering clutch 12.

The hydraulic control mechanism of this invention will now be described. A pair of pumps 51, 52 draw hydraulic fluid from a reservoir 54 through a supply conduit 56. Pump 51 supplies pressure fluid to left hand clutch valve 50 by way of a main supply passage 60 which includes conduit 57 and passage 53 in valve housing 55. A full flow filter 58 is interposed in conduit 57. Passage 53 connects with an inlet port 61 in valve bore 62. An exhaust port 63, a clutch supply port 64 and a right hand brake supply port 66 also open into valve bore 62. A valve spool 67 with appropriate recessed portions is operatively positioned in valve bore 62 and is biased toward a neutral position, in which shown, by a spring 68. The valve spool 67 is manually operated through a hand control lever 71 pivotally connected to the valve spool 67 by a link 72.

When the valve spool 67 is moved upwardly, the pressure fluid is directed to the left hand steering clutch 11 through clutch supply port 64, and a clutch supply passage 75 including housing passage 73 and conduit 74. When sufficient pressure fluid has been supplied to the pressure chamber 76 of the left hand steering clutch 11, the pressure of the fluid will build up to approximately 450 p.s.i. at which point the balanced relief valve 77 will open permitting fluid to flow from main supply passage 60 to right hand brake supply passage 78 which includes a conduit 82 connected to the hydraulic brake chamber 79 of the right hand hydraulic brake valve 81.

A movable relief valve element 84 is mounted in a sleeve 83 which is held against reciprocating movement by any suitable means, not shown. The opposite ends of the reciprocating valve element 84 are exposed to atmospheric pressure or a pressure so low as to have little or no biasing effect thereon. Relief valve 77 is biased to a closed position by a coil spring 86. The element 84 makes seating contact with the sleeve 83 about a circle whose diameter is the same as the diameter of bore 87 in which the bottom part of the relief valve element 84 fits. Thus fluid pressure in conduit 74 has no biasing effect upon the valve 77. Valve 77 may be considered to be in hydraulically balanced relation to the clutch supply conduit 74. The annular seating contact surface is of a greater diameter than the diameter of the bore 88 in which the upper end of the valve element 84 fits, and therefore fluid pressure in the main supply passage 60 will tend to overcome the biasing effect of spring 86 and, as previously stated, when the pressure in main supply passage 60 rises to approximately 450 p.s.i. the differential area relief valve 77 will open to permit fluid to flow from main passage 60 to right hand brake supply passage 78.

In the illustrated neutral position of the control valve 50 fluid from pump 51 will flow freely to the right hand brake control valve 81. The brake supply fluid flows into chamber 79, thence through an opening 91 formed in the central portion of a piston 92, thence the fluid flows from the interior low pressure chamber 93 of the brake control valve housing 94 to a return line 96. Return line 96 is connected in a conventional manner to a reservoir 54. A coil spring 101 biases the brake mechanism 36 to a released condition. The spring 101 also serves to urge the piston 92 upwardly to the position shown.

When the operator actuates the right hand brake pedal 106, a valve plunger 107 is moved downwardly to shut off flow through the passage 91 of the piston 92. The hydraulic pressure in chamber 79 then assists the operator in applying the right brake by virtue of the hydraulic pressure in chamber 79 acting against the closed end of actuator or piston 92. Thus the brake control valve 81 is in effect a combined hydraulic brake actuator and valve mechanism. The plunger 107 and piston 92 are operable as a shutoff valve and the piston 92, upon the passage 91 being closed, acts as an actuator for brake 36. If the operator holds the brake pedal 106 in a brake engaging position, the pressure will build up in chamber 79 sufficiently to open relief valve 111 which may be set to open at about 375 p.s.i., unless the operator applies a light foot pressure in which case fluid will throttle between the end of plunger 107 and the tapered sealing surface of opening 91.

Pump 52 supplies fluid to the control valve 108 for the right steering clutch 12 and, as is obvious from the drawings, the hydraulic controls for the right hand clutch 12 and the left hand brake 32 are similar to those hereinbefore described for controlling the left hand steering clutch 11 and the right hand brake mechanism 36.

Operation

As illustrated in the drawings, both of the clutch control levers 71, 109 are shown in their neutral position, and in this position both of the steering clutches 11, 12 are engaged. Thus the power supplied to the ring gear 24 will drive the running gear, not shown, at both sides of the vehicle. Also, as illustrated, the brake mechanisms are in a released condition. When it is desired to steer to the right, the right hand clutch control lever 109 will be moved so that the right hand clutch control valve 108 is moved upwardly to place the clutch supply passage 121 in communication with the main passage 112 thereby connecting pump 52 to supply port 113. Thus pressure fluid will be supplied to the steering clutch 12 through passage 111 to disengage the steering clutch 12. At the same time, the operator may desire to assist in turning by applying the right hand brake to resist movement of the running gear to which propelling power is no longer supplied. It will be noted that the hydraulic fluid for actuating the right hand brake mechanism 36 is supplied by pump 51. By thus using two pumps, time lag in response to the operator's movement of clutch control lever 109 and brake pedal 106 is reduced to a minimum. When the operator moves control lever 109 to disengage steering clutch 12, fluid is immediately delivered to the clutch 12 to release it, and if he simultaneously applies the brake mechanism 36 by depressing the brake pedal 106, the drum 17 is immediately prevented from rotating by virtue of the fact that the hydraulic fluid for actuating the brake mechanism 36 is supplied by pump 51 rather than pump 52.

If the operator wishes to steer to the left, he will move the control valve 50 by manipulation of control lever 71 so as to place the main passage 60 in fluid communication with the left hand clutch supply passage 75. At the same time, the operator may desire to apply the brake pedal 116 to operate the left hand brake mechanism 32, thereby preventing rotation of clutch drum 14. The left hand brake is operated by closing the opening 131 in actuator 132 with plunger 133 thereby causing build-up of pressure in cross flow passage 134. Relief valve 141 limits the pressure in chamber 118 in the same manner as relief valve 111 limits pressure in chamber 79.

The vehicle equipped with this invention may be conveniently cross steered, as is sometimes desired in downhill operations. Cross steering to the right is achieved by disengaging the left hand steering clutch 11 and engaging the right hand brake 36. Cross steering to the left is accomplished by applying the left hand brake 32 and disengaging the right hand steering clutch 12. Cross steering is utilized when the vehicle is traveling downhill, and the engine is utilized for braking. In such a condition, if the power train to the running gear at one side of the vehicle is disconnected, as by disengaging left clutch 11, the disconnected running gear at that side will tend to overspeed and turn the vehicle toward the opposite side. In order to control the radius of turn the right brake 36 is engaged to assist the engine in slowing down the running gear connected at the right side of the vehicle to shaft 18. If the clutch 12 were disengaged in such a maneuver the brake would be required to carry additional loading. Excessive overheating and wear of the brake linings would result.

By utilizing balanced relief valves 77, 117 the pressure built up in the brake chamber 79, 118 does not have an additive effect on the pressure in the main supply passages 60, 112. For instance, when clutch lever 71 is moved to place the supply from pump 51 in communication with the clutch pressure chamber 76 of steering clutch 11, and the operator engages the brake mechanism 36 through operation of the foot pedal 106 to achieve cross steering of the vehicle, the pressure in conduit 56 will not exceed approximately 450 p.s.i. and the pressure in chamber 79 will be approximately 375 p.s.i.

From the foregoing description, it is obvious that I have provided an extremely novel steering by driving control which has particular application in endless track vehicles, though not limited in application thereto. The use of direct pressure supply to the brakes and clutches on the same side of the vehicle through use of the cross flow arrangement, provide instantaneous response for normal steering by driving. This same arrangement also affords cross steering control for downhill operations. The use of balanced relief valves 77, 117 permit the fluid pressure to be no higher than required for proper operation of the steering clutches and brakes.

Although a single embodiment of this invention is illustrated, it is not intended to limit this invention except as necessitated by the appended claims.

What is claimed is:

1. A clutch and brake control for a vehicle having left and right hydraulically operated steering clutches and left and right hydraulic brakes for traction means carried at laterally opposite sides of said vehicle; comprising: a source of pressure fluid, first and second clutch valves for said right and left clutches, respectively, first and second brake valves for said right and left brakes, respectively, first and second main passages connecting, respectively, said first and second clutch valves in fluid communication with said source of pressure fluid, clutch supply passages connecting said first and second clutch valves to said right and left clutches, respectively, brake supply passages connecting said first and second brake valves to said right and left brakes, respectively, a first cross flow passage connecting said first clutch valve to said second brake valve, a second cross flow passage connecting said second clutch valve to said first brake valve, a first relief valve permitting fluid flow from said first main passage to said first cross flow passage at a first predetermined pressure of fluid in said first main passage, a second relief valve permitting fluid flow from said second main passage to said second cross flow passage at said first predetermined pressure of fluid in said second main passage, and a relief valve connected to each of said cross flow passages permitting fluid therein to escape at a second predetermined pressure.

2. The structure set forth in claim 1 wherein said first and second relief valves are hydraulically balanced relative to said first and second cross flow passages, respectively.

3. The structure set forth in claim 1 wherein said second predetermined pressure is lower than said first predetermined pressure.

4. The structure set forth in claim 1 wherein said first and second relief valves are hydraulically balanced relative to said first and second cross flow passages, respectively, and said second predetermined pressure is lower than said first predetermined pressure.

5. A clutch and brake control for a vehicle having left and right hydraulically operated steering clutches and left and right hydraulically actuated friction brakes for traction means carried at laterally opposite sides of said vehicle; comprising: a source of pressure fluid, first and second clutch valves for said right and left clutches, respectively, first and second combined hydraulic brake actuator and valve mechanisms for said right and left brakes, respectively, each of said mechanisms including a hydraulic actuator and biasing means urging said actuator toward a non-braking position, said biasing means also urging said brake to a released condition, first and second main passages connecting, respectively, said first and second clutch valves in fluid communication with said source of pressure fluid, clutch supply passages connecting said first and second clutch valves to said right and left clutches, respectively, brake supply passages connecting said first and second brake valves to said right and left brakes, respectively, a first cross flow passage connecting said first clutch valve to said second brake valve, a second cross flow passage connecting said second clutch valve to said first brake valve, a relief valve permitting fluid flow from said first main passage to said first cross flow passage at a first predetermined pressure of fluid in said first main passage, a relief valve permitting fluid flow from said second main passage to said second cross flow passage at said first predetermined pressure of fluid in said second main passage, and a relief valve connected to each of said cross flow passages permitting fluid therein to escape at a second predetermined pressure.

References Cited in the file of this patent

UNITED STATES PATENTS

| | | |
|---|---|---|
| 2,771,958 | Ball | Nov. 27, 1956 |
| 2,781,858 | Kelley et al. | Feb. 19, 1957 |
| 2,883,019 | Kerschner et al. | Apr. 21, 1959 |
| 2,930,257 | Christenson | Mar. 29, 1960 |